(12) United States Patent
Haraughty

(10) Patent No.: US 6,637,244 B2
(45) Date of Patent: Oct. 28, 2003

(54) WATER BOTTLE HOLDER WITH BICYCLE LOCK

(75) Inventor: James Haraughty, Monona, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 10/068,260

(22) Filed: Feb. 6, 2002

(65) Prior Publication Data

US 2003/0145637 A1 Aug. 7, 2003

(51) Int. Cl.[7] .............................. E05B 71/00; B62H 5/00
(52) U.S. Cl. .................................. 70/233; 70/18; 70/30
(58) Field of Search ............................ 70/233, 18, 30, 70/49; 248/311.2, 313, 302; 224/414, 425, 926

(56) References Cited

U.S. PATENT DOCUMENTS

| | | | | |
|---|---|---|---|---|
| 3,781,861 A | * | 12/1973 | Adler et al. ................. 340/571 |
| 3,817,063 A | * | 6/1974 | Williams ........................ 70/24 |
| 4,012,930 A | * | 3/1977 | Benson ........................ 70/234 |
| 4,079,872 A | * | 3/1978 | Halter ......................... 224/418 |
| 4,387,835 A | * | 6/1983 | Golzer ......................... 224/417 |
| 4,490,997 A | * | 1/1985 | Hughes et al. ................. 70/233 |
| 5,598,727 A | * | 2/1997 | White ........................... 70/233 |

OTHER PUBLICATIONS

ABUS pocket guide.
Minoura 1999 product catalog, p. 16.
Zefal 2001–2002 catalog, p. 28.
Ming Tay product brochure.
Master Lock brochure 7000–0187.
Elite 2001 product catalog, pp. 22–23.

* cited by examiner

Primary Examiner—Anthony Knight
Assistant Examiner—Michael J. Kyle
(74) Attorney, Agent, or Firm—Boyle Fredrickson Newholm Stein & Gratz S.C.

(57) ABSTRACT

A bicycle lock attached to a beverage container holder securable to a bicycle frame is provided. The lock is attached to the bottom of the bottle holder in order to position the lock in an easily accessible and out of the way location on a bicycle frame. The lock includes an extendible cable which can be encircled about the bicycle frame and an immovable object and reengaged with the lock to ensure that the bicycle cannot be stolen.

13 Claims, 1 Drawing Sheet

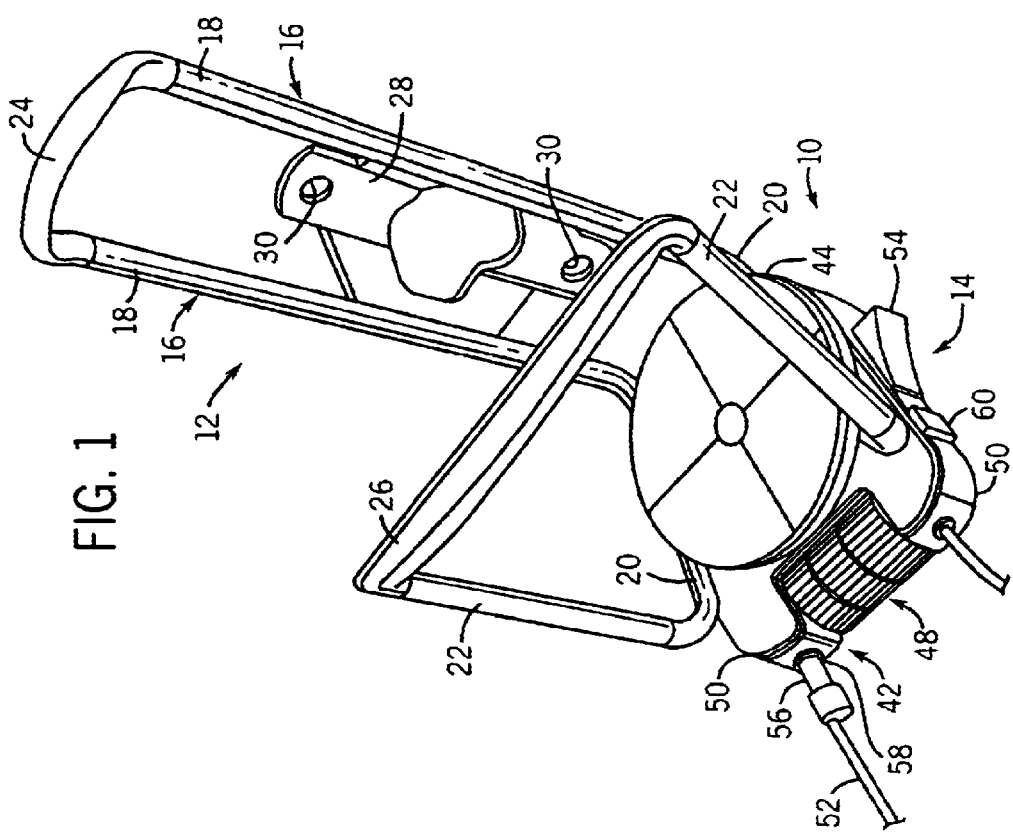
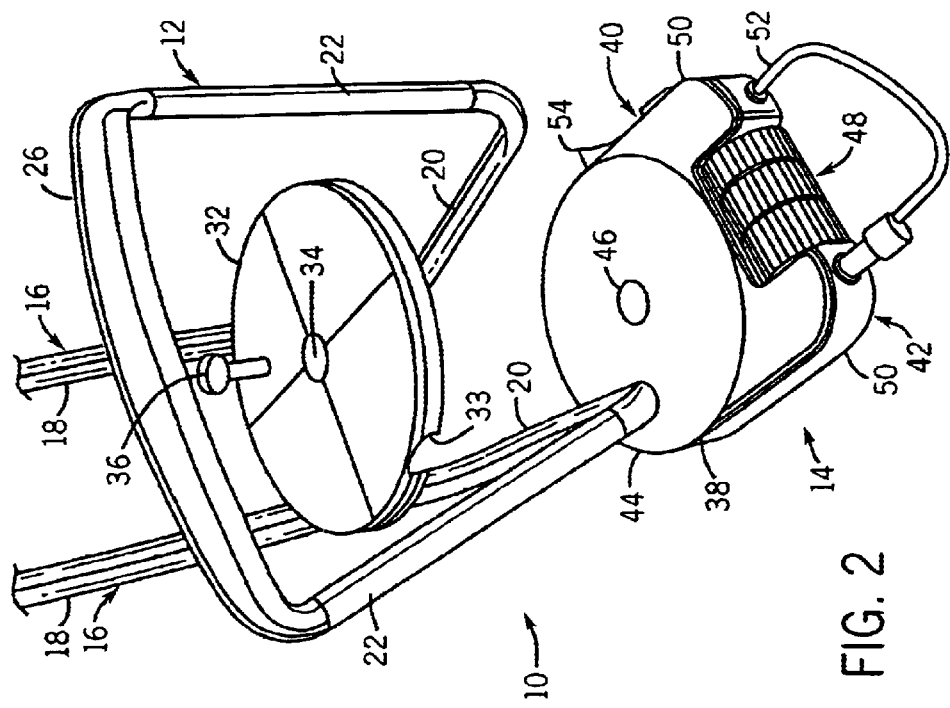

WATER BOTTLE HOLDER WITH BICYCLE LOCK

FIELD OF THE INVENTION

The present invention relates to bicycles and more specifically to a bicycle lock secured to a water bottle holder attachable directly to a frame of a bicycle.

BACKGROUND OF THE INVENTION

In order to prevent bicycles from being stolen, a number of different types of bicycle locks have been developed. The bicycle locks take many shapes and forms in order to effectively prevent the theft of a bicycle.

While most of the bicycle locks that have been developed are highly effective in preventing the unauthorized removal of a bicycle, one of the major drawbacks with regard to bicycle locks is that the locks are most often very unwieldy due to the heavy bars or chains associated with the locks. As a result, because an individual riding a bicycle has to maintain his or her balance on the bicycle at all times, the presence of an unwieldy bicycle lock on either the bicycle or the rider can be a nuisance and possibly a danger to the rider. To remedy this, a number of bicycle locks have been developed which include mounting arrangements for securing the bicycle lock to the frame of a bicycle. However, most of these locks which are mounted to the bicycle frame are still fairly large and unwieldy, and can present the same types of problems as non-mounted locks when a person is riding a bicycle.

Therefore, it is desirable to develop a bicycle lock which can be secured to the bicycle frame in a highly unobtrusive manner to avoid any interference with the person riding the bicycle. Further, it is desirable that the locking device be capable of securely locking a bicycle to immovable object to effectively prevent the bicycle from being stolen.

SUMMARY OF THE INVENTION

It is an object of the present invention to provide a bicycle lock which is securable to a bicycle frame in an unobtrusive manner.

It is another object of the present invention to provide a bicycle lock which is capable of securing a bicycle to an immovable object in a reliable fashion.

It still another object of the present invention to provide a bicycle lock attached to a water bottle holder is securely mounted to the bicycle frame.

The present invention is a bicycle lock securable to a bicycle frame. The bicycle lock is attached to a bracket that is mountable directly to a tube of a bicycle frame. The bracket is also adapted to function as a water bottle or beverage container holder, as are well known in the prior art. The bicycle lock is mounted to the bottom end of the bracket such that the lock does not interfere with an individual riding the bicycle or with the insertion of a water bottle into the bracket. The lock includes an extendible and retractable cable that can be withdrawn from the lock, extended around a suitable immovable object and the bicycle frame, and engaged within a locking orifice on the lock to retain the bicycle and lock in attachment with the immovable object.

Various other features, objects and advantages of the invention will be made apparent from the following detailed description taken together with the drawings.

BRIEF DESCRIPTION OF THE DRAWINGS

The drawings illustrate the best mode currently contemplated of practicing the invention.

In the drawings:

FIG. 1 is a perspective view of the bicycle lock constructed according to the present invention; and FIG. 2 is an exploded perspective view of the bicycle lock of FIG. 1.

DETAILED DESCRIPTION OF THE INVENTION

With reference now to the drawing figures in which like reference numerals designate like parts throughout the disclosure, a bicycle lock apparatus constructed according to the present invention is indicated at 10 in FIG. 1. The lock apparatus 10 includes a bracket 12 and a lock 14 secured to the bracket 12. The bracket 12 is formed of a pair of tubular members 16 that each include a generally vertical rear portion 18, a generally horizontal bottom portion 20, and a generally vertical front portion 22. The tubular members 16 are joined at the rear portions 18 and front portions 20 by a rear end member 24 and a front end member 26, respectively.

The bracket 12 also includes a mounting member 28 that is positioned and attached between the rear portions 18 of each tubular member 16. The mounting member 28 includes a curved outer wall that is adapted to conform to the shape of bicycle frame (not shown) to which the bracket 12 is attached. Mounting member 28 also includes openings 30 through which a fastener (not shown), such as a screw or bolt, can be inserted to engage the bicycle frame and fixedly secure the bracket 12 to the frame.

The apparatus 10 also includes a support member 32 positioned across the bottom portions 20 between the rear portions 18 and front portions 22 of the tubular members 16. The support member 32 is fixedly secured to the bottom portions 20, such as by an adhesive or mechanical fastener, and includes a pair of recesses 33 that receive part of each of the bottom portions 20. The member 32 provides a generally flat support surface for a beverage container, such as a water bottle, which is positionable in the bracket 12. The support member 32 also includes a central opening 34 through which a fastener 36 can be inserted to engage and retain the lock 14 positioned beneath the bracket 12.

Referring now to FIG. 2, the lock 14 can be any type of small, retractable lock, such as the Retractor 3000, manufactured by Kryptonite of Canton, Mass. As shown in FIG. 2, the lock 14 includes a top surface 38, a bottom surface 40, a first end 42 formed between the top surface 38 and bottom surface 40 spaced from the bracket 12, and a second end 44 formed between the top surface 38 and bottom surface 40 and positioned benneath the bracket 12. The top surface 38 includes an opening 46 in which the fastener 36, such as a threaded screw, retaining clip, or other equivalent fastening means is received to attach the lock 14 to the bracket 12.

The first end 42 of the lock 14 includes a rotatable combination mechanism 48 disposed between a pair of end portions 50. While the rotatable combination mechanism 50 is shown, it is contemplated that a key-operated, or other conventional type of lock mechanism could also be used. A cable 52 is disposed within one of the end portions 50 with one end of the cable 52 extending outwardly from the end portion 50. The other end of the cable 52 is secured to an rewind mechanism (not shown) disposed within the lock 14 such that the cable 52 can be selectively withdrawn and retracted from within the lock 14. The rewind mechanism also includes a releasable stop (not shown) that is activated by a switch 54 disposed on one side of the lock 14. By depressing the switch 54, the stop is disengaged from the rewind mechanism such that the cable 52 can be withdrawn from within the lock 14. When the cable 52 has been withdrawn to a desired length, a switch 54 can be released, enabling the stop to prevent further extension or retraction of the cable 52. When it is desired to fully retract the cable within the lock 14, the switch 54 can be depressed to enable the rewind mechanism to completely retract the cable 52.

The free end of the cable 52 includes an engagement portion 56 that can be inserted into a locking opening 58 disposed in the end portion 50 opposite the cable 52. The locking opening 58 is adapted to receive the engagement portion 56 of the cable 52 in such a manner as to lockingly retain the engagement portion 56 therein to effectively lock the apparatus 10 and bicycle to the immovable object. When it is desired to remove the engagement portion 56 from the opening 58, the combination mechanism 48 is rotated to provide the appropriate numerical combination to enable a button 60 disposed adjacent the locking opening 58 to be depressed. When the button 60 is depressed, the mechanism is disengaged and the engagement portion 56 can be removed from the opening 58 to remove the bicycle from the immovable object.

While the foregoing description describes the best mode currently contemplated of carrying out the present invention, various alternatives are contemplated as being within the scope of the following claims which particularly point out and distinctly claim the subject matter regarded as the invention.

We claim:

1. A locking apparatus comprising:
   a bracket attachable to a bicycle frame and adapted to receive and retain a beverage container therein; and
   a lock fixedly attached to the bracket and including a locking member positionable around an object and releasably engageable with the lock, wherein the lock forms a part of a base of the apparatus that is adapted to support the container.

2. The apparatus of claim 1 wherein the lock is a combination lock.

3. The apparatus of claim 1 wherein the locking member is a cable selectively extendible from the lock.

4. The apparatus of claim 3 wherein the lock includes a rewind mechanism operatively engaged with the cable.

5. The apparatus of claim 1 wherein the bracket includes a rear portion securable to the bicycle frame, a front portion adapted to releasably retain the beverage container in the bracket, and a bottom portion extending between the front and rear sections, wherein the lock is fixedly secured to the bottom portion to form the base.

6. A bicycle locking apparatus comprising:
   a) a non-deflectable bracket attachable to a bicycle frame, the bracket including a rear portion positionable against the bicycle frame, a bottom portion oriented generally perpendicularly with respect to the rear portion, and a front portion extending generally perpendicularly from the bottom portion opposite the rear portion;
   b) a plate secured to the bottom portion between the rear portion and the front portion; and
   c) a lock secured to the bottom portion and the plate.

7. The apparatus of claim 6 wherein the plate and the lock are positioned on opposite sides of the bottom portion.

8. The apparatus of claim 6 wherein the front portion includes an end member disposed opposite the bottom portion.

9. The apparatus of claim 6 wherein the rear portion includes at least one fastener receiver adapted to receive a fastener therethrough to fixedly secure the bracket to the bicycle frame.

10. The apparatus of claim 6 wherein the bracket is formed of a pair of generally U-shaped bars secured to one another by a pair of end members located at opposite ends of each bar.

11. The apparatus of claim 6 wherein the lock is releasably secured to the bottom portion.

12. The apparatus of claim 6 wherein the plate is releasably secured to the bottom portion.

13. A bicycle locking device comprising:
   a) a rigid bracket attachable to a bicycle frame end adapted to receive and retain a beverage container therein, the bracket including a rear portion positionable in a generally vertical orientation against the bicycle frame, a bottom portion oriented generally perpendicularly with respect to the rear portion, and a front portion extending generally perpendicularly from the bottom portion opposite the rear portion;
   b) a plate secured to the bottom portion between the rear portion and the front portion; and
   c) a lock secured to the bottom portion and the plate in both a locked and unlocked configuration.

* * * * *